United States Patent [19]

Noguchi et al.

[11] 4,127,095
[45] Nov. 28, 1978

[54] TORCH-IGNITION INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 787,223

[22] Filed: Apr. 13, 1977

[30] Foreign Application Priority Data

Apr. 22, 1976 [JP] Japan ................................. 51-45953

[51] Int. Cl.² ............................................ F02B 23/08
[52] U.S. Cl. ............................. 123/30 D; 123/191 S; 123/191 SP
[58] Field of Search ............... 123/30 D, 32 C, 32 K, 123/32 SA, 32 SP, 32 ST, 191 S, 191 SP, 193 CH, 193 H

[56] References Cited

U.S. PATENT DOCUMENTS

| | | | |
|---|---|---|---|
| 2,100,320 | 11/1937 | Browning | 123/191 S |
| 2,853,060 | 9/1958 | Hockel | 123/32 K |
| 3,102,521 | 9/1963 | Slemmons | 123/32 ST |
| 3,776,212 | 12/1973 | Karlowitz | 123/30 D |
| 3,814,067 | 6/1974 | Fuente | 123/32 C |
| 3,926,158 | 12/1975 | Dolza | 123/32 ST |
| 4,041,922 | 8/1977 | Abe et al. | 123/32 SP |

FOREIGN PATENT DOCUMENTS

838,326   6/1960   United Kingdom ............... 123/191 SP

*Primary Examiner*—Charles J. Myhre
*Assistant Examiner*—Craig R. Feinberg
*Attorney, Agent, or Firm*—Cushman, Darby & Cushman

[57] ABSTRACT

A torch-ignition internal combustion engine has a main and pre-combustion chambers communicated with each other through a torch aperture. Electrodes of a spark plug are disposed in the pre-combustion chamber at a point remote from the torch aperture. A fresh charge of a lean air-fuel mixture is supplied through an intake port into the main chamber on an intake stroke and compressed during a compression stroke so that a part of the fresh mixture charge is introduced through the torch aperture into the pre-combustion chamber. A tubular passage is provided and extends in the pre-combustion chamber toward the plug electrodes to guide the mixture part from the torch aperture toward the plug electrodes during the compression stroke for thereby displacing residual combustion gases away therefrom whereby the plug electrodes are scavenged for improved reliable spark-ignition of the mixture therearound to produce an initial combustion flame which propagates into the passage to produce a torch running through the torch aperture into the main chamber for the torch-ignition of the mixture charge therein. The residual combustion gases in the pre-combustion chamber are mixed with a portion of the fresh mixture part introduced into the pre-combustion chamber to form a stratum or strata of combustible gas which is retained in a space or spaces therein remote from the plug electrodes and which is also burnt by the initial combustion flame at a vurning velocity lower than that of the fresh mixture in the passage. The production of the torch lasts by the time the combustion of the stratum or strata of the combustible gas is completed, whereby the duration of the torch is greatly prolonged compared with the prior art with a resultant improved torch-ignition of the mixture in the main chamber.

10 Claims, 11 Drawing Figures

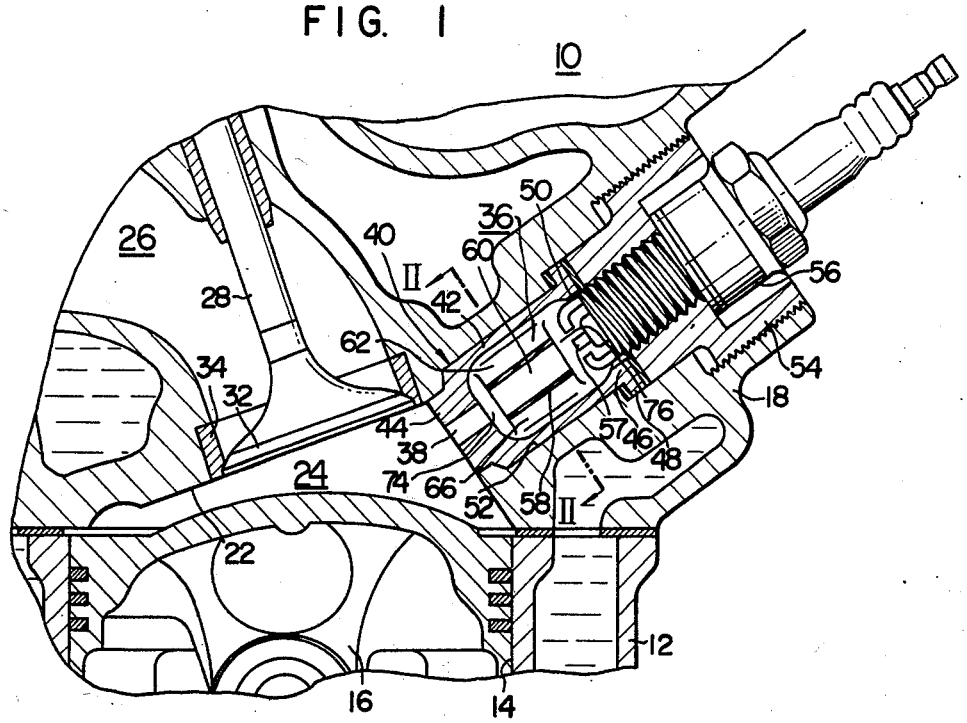

TORCH-IGNITION INTERNAL COMBUSTION ENGINE

The present invention relates to an internal combustion engine and, more particularly, to a torch-ignition internal combustion engine having a pre-combustion chamber for the torch-ignition of a charge of a lean air-fuel mixture fed into a main combustion chamber of the engine. The pre-combustion chamber will be called "trap chamber" herein for the reason to be made apparent later.

Torch-ignition internal combustion engines of the class referred to above were already known in the art. One type of the known torch-ignition engines had a cylinder block defining therein a cylinder bore, a piston reciprocally mounted in the cylinder bore and a cylinder head mounted on the top of the cylinder block to cooperate with the cylinder bore and the piston to define a main combustion chamber. The cylinder head defined therein an intake port connected to the main combustion chamber. The communication between the intake port and the main combustion chamber was controlled by an intake valve. A charge of a lean air-fuel mixture was supplied through the intake port into the main combustion chamber when the intake valve was open during an intake stroke of the engine. A trap chamber was confined in the cylinder head and communicated with the main combustion chamber through a torch aperture. On a compression stroke of the engine, a part of the mixture charge to the main combustion chamber was introduced through the torch aperture into the trap chamber and retained therein during the compression stroke. A set of electrodes of a spark plug was disposed within the trap chamber at a point remote from the torch aperture to ignite the mixture in the pre-combustion chamber thereby to produce a torch running through the torch aperture into the main combustion chamber for the torch-ignition of the mixture therein.

The torch-ignition type internal combustion engines had the maximum advantage or merit that the production of harmful gases was suppressed at the stage of combustion of an air-fuel mixture in the engines. However, the internal combustion engines of the type concerned has a general characteristic that the engine performance was greatly influenced by the shape of the trap chamber, the size and orientation of the torch aperture and the position of the spark plug electrodes. The most important factors of the engine performance were the ignitability and the torch effect.

It has been found by the inventors that, with the above-described arrangement of the trap chamber, torch aperture and spark plug electrodes in the prior art torch-ignition engine, the residual gases produced during the preceding combustion stroke and retained in the trap chamber were forced into the inner part of the trap chamber by an air-fuel mixture introduced through the torch aperture into the trap chamber by the upward movement of the piston on a compression stroke. At the time of spark-ignition, the residual combustion gases were thus retained in the inner part of the trap chamber to form a stratum in the vicinity of the spark plug electrodes with a resultant decrease in the reliability of spark-ignition in the trap chamber. Particularly, the spark-ignitability was decreased at a light-load engine operating condition with a resultant poor engine drivability. Moreover, the front face of a combustion flame produced by a spark-ignition in the trap chamber proceeded form the inner part thereof toward the torch aperture on the combustion stroke. Thus, the amount of the air-fuel mixture which was present between the trap chamber inner part and the torch aperture was forced out of the trap chamber through the torch aperture by the combustion flame while the mixture was still in the unburnt state, with resultant poor torch effect.

It is an object of the present invention to eliminate the difficulty described above. More particularly, the present invention aims to improve the spark-ignitability and torch effect in the torch-ignition type internal combustion engines thereby to achieve a reliable torch-ignition of a lean air-fuel mixture in the main combustion chamber.

For this purpose, the present invention provides an internal combustion engine of the above-discussed torch-ignition type with means defining a generally tubular passage extending in the trap chamber to positively guide from the torch aperture toward the plug electrodes a part of the mixture charge to the main combustion chamber during the compression stroke of the engine for displacing the residual combustion gases away from the plug electrodes.

By this feature of the invention, a part of the fresh mixture introduced into the trap chamber is distributed in the vicinity of the plug electrodes at the end of the compression stroke of the engine and thus is reliably ignitable by a spark discharge produced by the plug electrodes thereby to produce an initial combustion flame in the trap chamber. Another part of the fresh mixture introduced into the trap chamber is mixed with the residual combustion gases therein to form a stratum or strata at a point or points remote from the plug electrodes. The initial combustion flame propagates to the fresh mixture in the passage to produce a torch which spurts from the torch aperture into the main combustion chamber. The initial combustion flame also propagates to the stratum of the mixture consisting of the residual combustion gases and the other part of the fresh mixture to burn the stratum or strata of the mixture. Accordingly, the energy of the torch is gradually increased and the duration of the run of the torch is prolonged with a resultant advantage that the lean mixture in the main combustion chamber is reliably ignited by the torch.

The trap chamber may be so shaped as to have end and peripheral walls. The torch aperture may be formed in one of the end walls of the trap chamber while the plug electrodes may protrude through the other end wall into the trap chamber. Preferably, the passage may be substantially straight and substantially axially aligned with the torch aperture.

The peripheral wall of the trap chamber may be substantially cylindrical. The passage defining means may preferably comprise a substantially cylindrical wall disposed in the trap chamber in substantially concentric or eccentric relationship to the cylindrical peripheral wall of the trap chamber. The passage may have its opposite ends spaced from the opposite end walls of the trap chamber with end spaces being left therebetween. The plug electrodes may be disposed in one of the end spaces. Alternatively, one end of the passage may be connected to the end wall of the trap chamber in which the torch aperture is formed, while the other end of the passage is spaced from the other end wall of the trap chamber with an end space left therebetween, the plug electrodes being disposed in the end space. Further alternatively, the passage may have its axis extending obliquely with respect to the axis of the trap chamber with one end of the passage connected to the trap chamber end wall in which the torch aperture is formed. In the case where the opposite ends of the passage defining cylindrical wall are spaced from the opposite trap chamber end walls, the cylindrical wall may preferably be supported from the trap chamber peripheral wall by at least one radial wall extending therebetween. The trap chamber peripheral wall and the passage defining cylindrical wall may preferably define therebetween a circumferentially continuous or discontinuous side space which is connected to and continuous with the end space in which the plug electrodes are disposed.

The peripheral wall of the trap chamber may alternatively be quadrilateral in cross-section. In this case, the passage defining means may preferably include a pair of substantially parallel walls extending between a first pair of opposite side walls of the trap chamber to cooperate therewith to define the passage. The parallel walls also cooperate with the other side walls of the trap chamber to define therebetween a pair of laterally spaced side spaces each connected and continuous with the end space in the trap chamber in which the plug electrodes are disposed.

The provision of the side space or spaces in communication with the end space in which the plug electrodes are disposed assures that, when the fresh mixture is forced through the torch aperture into the trap chamber and flows through the passage toward the plug electrodes, the residual combustion gases in the trap chamber are moved away from the plug electrodes into the side space or spaces and are mixed with a part of the fresh mixture to form a combustible stratum or strata of gases in the side space or spaces.

The above and other objects, features and advantages of the present invention will be made more apparent by the following description with reference to the accompanying drawings.

FIG. 1 is a fragmentary sectional view of an embodiment of the torch-ignition internal combustion engine according to the present invention showing a trap chamber in an axtial section taken along line I — I in FIG. 2;

FIG. 2 is a cross-section of the trap chamber taken along line II — II in FIG. 1;

Figure 3:
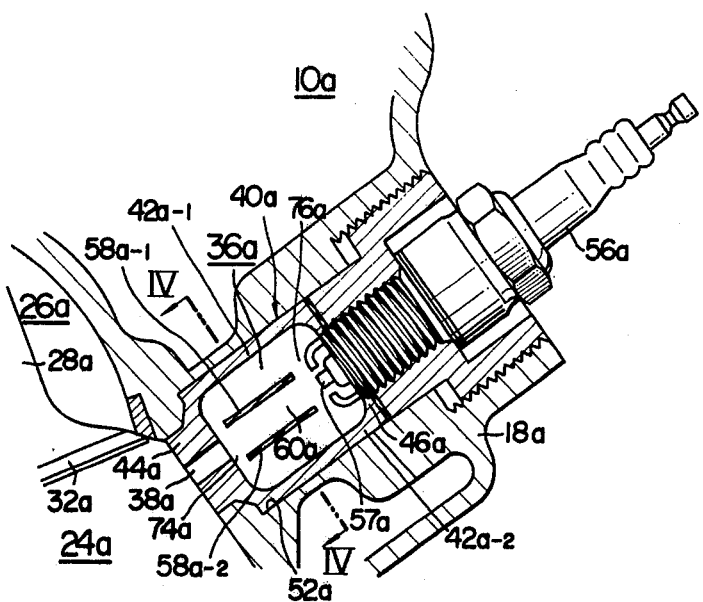
FIG. 3 is a fragmentary sectional view of a cylinder head of a second embodiment of the invention with a modified trap chamber shown in a longitudinal section taken along line III — III in FIG. 4.

Referring first to FIGS. 1 and 2, an embodiment of the torch-ignition internal combustion engine according to the present invention is generally designated by reference numeral 10 and includes a cylinder block 12 defining therein a plurality of cylinder bores one of which is shown and designated by 14. A piston 16 is reciprocally mounted in the cylinder bore 14. A cylinder head 18 is secured to the top of the cylinder block 12 and has a bottom or inner face in which is formed a recess 22 which cooperates with the top of the piston 16 to define a main combustion chamber 24. The piston 16 is shown in its top dead center position. The cylinder head 18 defines therein an intake port 26 having a downstream end connected to the main combustion chamber 24. An intake valve 28 having a valve head 32 and shown in its closed position is reciprocally mounted on the cylinder head 18 to cooperate with a valve seat 34 to control the communication between the intake port 26 and the main combustion chamber 24 in well-known manner.

A generally cylindrical trap chamber 36 is provided in the cylinder head 18 and communicated with the main combustion chamber 24 through a single torch aperture 38 substantially coaxial with the trap chamber 36. In the illustrated embodiment of the invention, the trap chamber 36 is confined by a generally pot-shaped cylindrical trap-chamber insert 40 of a metal cast by lost-wax process. The insert 40 has a substantially cylindrical peripheral wall 42, an inner end wall 44 of a reduced diameter and an outer end wall 46 having a radially outwardly extending flange 48. An opening 50 is formed in the outer end wall 46. The torch aperture 38 is formed in the inner end wall 44 of the insert 40. The insert 40 is inserted in a through-hole or bore 52 in the cylinder head 18 and held in position by a plug holder 54 screwed into the cylinder 18 so that the inner end wall 44 of the insert 40 is substantially flash with the adjacent surface of the recess 22 in the cylinder head 18. A spark plug 56 is screwed into the plug holder 54 so that a set of electrodes 57 of the plug 56 extends through the opening 50 in the end wall 48 of the trap-chamber insert 40 and is disposed in the trap chamber 36.

As best seen in FIG. 2, a substantially cylindrical wall 58 defining therein a substantially cylindrical inner passage 60 is provided in the trap chamber 36 substantially in concentric relationship to the cylindrical peripheral wall 42 of the trap chamber insert 40. The cylindrical wall 58 is supported from the cylindrical peripheral wall 42 of the trap-chamber insert 40 by three circumferentially spaced radial walls 62, 64 and 66 extending therebetween. The radial walls 62 to 66 cooperate with the trap chamber peripheral wall 42 and the cylindrical wall 58 to define circumferentially discontinuous side spaces 68, 70 and 72. In the illustrated embodiment of the invention, the cylindrical and radial walls 58 and 62 to 66 are all integral with the trap chamber peripheral wall 42.

As will be seen in FIG. 1, the cylindrical wall 58 is axially coextensive with the radial wall 62 to 66. These walls 58 and 62 to 66 are positioned in the trap chamber 36 such that the axial opposite ends of the walls are spaced from the opposite end walls 44 and 46 of the trap-chamber insert 40, respectively, so that end spaces 74 and 76 are left therebetween, respectively. Thus, the cylindrical passage 60 and the side spaces 68 to 72 are communicated with each other through the opposite end spaces 74 and 76. The cylindrical passage 60 is substantially coaxial with the torch aperture 38 and the spark plug 56 and has an inner diameter slightly larger than that of the torch aperture 38. The diameter of the passage 60, however, may alternatively be substantially equal to the torch aperture diameter.

In operation, the intake valve 28 is moved to its open position on an intake stroke of the engine while the piston 16 is downwardly moved to suck a fresh charge of a lean air-fuel mixture from the intake port into the main combustion chamber 24. The fresh mixture charge is mixed with a small amount of residual gases which were produced during the preceding combustion stroke and remained in the main combustion chamber until the intake stroke was initiated, so that the main combustion chamber is now filled with a mixture rich with the fresh air-fuel mixture. Because of the construction of the trap chamber 36, the trap chamber is not well scavenged during the intake stroke and is filled substantially with residual combustion gases at the end of the intake stroke.

On a compression stroke, the piston 16 is moved upwardly to compress the gases in the main combustion chamber 24 as well as in the trap chamber 36. Because the volume of the main combustion chamber 24 is reduced while the volume of the trap chamber 36 remains unchanged, a part of the fresh mixture in the main chamber 24 is forced through the torch aperture 38 into the trap chamber 36. A substantial portion of the mixture part flows through the end space 74 in the trap chamber 36 into the passage 60 and is guided by the cylindrical wall 58 into the other end space 76 to blow the residual combustion gases away from the plug electrodes 57 into the side spaces 68 to 72 whereby the plug electrodes are now exposed to and surrounded by the fresh air-fuel mixture. A part of the fresh mixture flows into the side spaces 68 to 72 and is mixed with the residual combustion gases to form masses or strata of combustible gases therein.

The spark plug is then electrically energized to produce a spark discharge. Because the plug electrodes 57 are surrounded by the fresh air-fuel mixture as discussed above, the spark discharge reliably ignites the mixture to produce an intial combustion flame or fire in the end space 76 in the trap chamber 36. The initial fire propagates to the fresh mixture in the passage 60 at an extremely high velocity while the fire propagates also to the strata of combustible gases in the side spaces 68 to 72. The propagation of fire into the side spaces proceeds stably although the fire propagation into the side spaces 68 to 72 is at a relatively low velocity because of the presence of the residual combustion gases in the side spaces 68 to 72.

The combustion in the trap chamber 36 produces a torch which spurts from the torch aperture 38 into the main combustion chamber 24. The production of the torch begins just after the propagation of the initial combustion flame to the fresh mixture in the passage 60 and lasts by the time the combustion flame propagates throughout the side spaces 68 to 72 to burn the gases therein. Thus, the time lag from the initial spark-ignition of the mixture to the generation of the torch in the main combustion chamber is greatly reduced, while the duration of the production of the torch (i.e., the period of time while the production of the torch lasts) is greatly prolonged with a resultant increase in the energy and thus the effect of the torch whereby the lean mixture in the main combustion chamber is reliably ignited by the torch and stably burnt therein at a high burning velocity.

It will be appreciated that the positioning of the plug electrodes in the inner part of the trap chamber remote from the torch aperture as in the illustrated embodiment of the invention is more convenient than at another point. The provision of the cylindrical wall 58 in the trap chamber 36 makes this plug electrodes positioning possible as well as improves the spark-ignitability and the torch effect, as discussed above.

Figure 4:
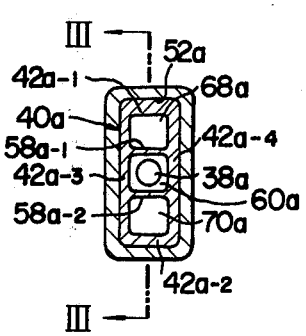
FIG. 4 is a cross-section of the modified trap chamber taken long line IV — IV in FIG. 3.

FIGS. 3 and 4 illustrate a second embodiment of the invention generally designated by reference numeral 10a. Parts of the embodiment 10a similar to those of the first embodiment 10 are designated by similar reference numerals added with a character "a." The embodiment 10a is substantially similar in construction to the first embodiment 10 except for the structure of a trap-chamber insert 40a defining therein a trap chamber 36a. The trap chamber insert 40a is of a rectangular cross-section and includes two pairs of opposite side walls 42a-1, 42a-2, 42a-3 and 42a-4, as will be best seen in FIG. 4. A pair of substantially parallel walls 58a-1, and 58a-2 are provided in the trap chamber 36a and extend between and interconnect the pair of side walls 42a-3 and 42a-4 to cooperate with each other and with these side walls to define a passage 60a. The walls 58a-1 and 58a-2 are substantially parallel to the other pair of side walls 42a-1 and 42a-2 to define therebetween a pair of side spaces 68a and 70a. The ends of the walls 58a-1 and 58a-2 are spaced from the opposite end walls 44a and 46a of the trap chamber 36a with end spaces 74a and 76a left between the ends of the walls 58a-1 and 58a-2 and the trap chamber end walls 44a and 46a, respectively, so that the passages 60a and the side spaces 68a and 70a are communicated with each other through the opposite end spaces 74a and 76a. The passage 60a is substantially axially aligned with a torch aperture 38a in the end wall 44a as well as with a set of electrodes 57a of a spark plug 56a. The spark plug electrodes 57a are disposed in the end space 76a in the trap chamber 36a.

The operation of the trap chamber 36a of the above-described structure and arrangement is substantially similar to the operation of the trap chamber 36 of the first embodiment 10.

Figure 5:
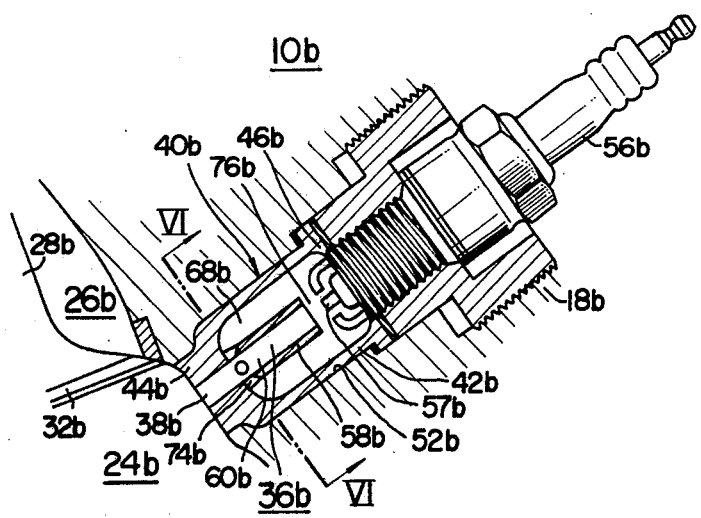
FIG. 5 is a view similar to FIG. 3 but illustrates a third embodiment of the invention with a further modified trap chamber shown in an axial section taken along line V — V in FIG. 6.
Figure 6:
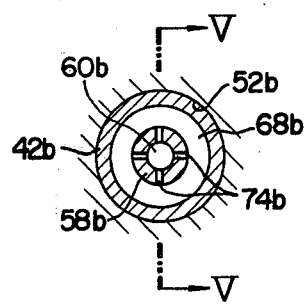
FIG. 6 is a cross-section of the further modified trap chamber taken along line VI — VI in FIG. 5.

FIGS. 5 and 6 illustrate a third embodiment of the invention generally designated by reference numeral 10b. The embodiment is substantially similar in structure to the first embodiment 10 except for the trap chamber structure. Parts of the embodiment 10b similar to those of the first embodiment 10 are designated by similar reference numerals added with a character "b." A trap-chamber insert 40b used in this embodiment has a substantially cylindrical peripheral wall 42b and end walls 44b and 46b, as in the first embodiment 10. A torch aperture 38b is formed in the end wall 44b, while a set of electrodes 57b of a spark plug 56b protrudes through the other end wall 46b of the trap chamber 36b and is disposed therein. A substantially cylindrical wall 58b is provided in the trap chamber 36b substantially in concentric relationship with the cylindrical peripheral wall 42b of the trap-chamber insert 40b and connected at one end to the end wall 44b and extends therefrom toward the other end wall 46b. The other end of the cylindrical wall 58b is spaced from the end wall 46b with an end space 76b left therebetween, in which the plug electrodes 57b are disposed. The cylindrical wall 58b has a substantially cylindrical outer peripheral surface which cooperates with the inner peripheral surface of the trap chamber peripheral wall 42b to define therebetween an annular side space 68b connected to and continuous with the end space 76b. The cylindrical wall 58b defines therein a substantially cylindrical passage 60b having a diameter substantially equal to that of the torch aperture 38b and being substantially smoothly continuous therewith. A plurality of lateral apertures 74b are formed in the cylindrical wall 58b adjacent to the end wall 44b to communicate the passage 60b with the side space 68b.

The trap chamber 36b of the above-described structure and arrangement is operative substantially as in the first embodiment 10 of the invention.

FIGS. 7 to 11 illustrate combinations of still further modified trap-chamber inserts and spark plugs. Parts in these figures similar or generally similar to those of the first embodiment 10 are designated by similar reference numerals added with characters "c" to "g," respectively.

Figure 7:
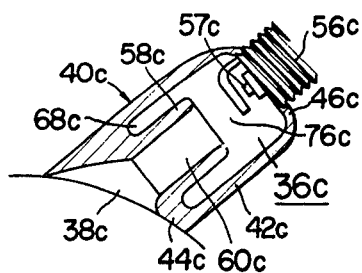
FIGS. 7 to 11 illustrate still further modified trap chambers, respectively.

The trap-chamber insert 40c shown in FIG. 7 defines therein a trap chamber 36c and is generally similar to the trap-chamber insert 40b of the third embodiment 10b shown in FIGS. 5 and 6 with the exceptions that a torch aperture 38c formed in one end wall 44c of the insert 40c is divergent outwardly toward the main combustion chamber (not shown in FIG. 7) and that no aperture is formed in a cylindrical wall 58c extending from the end wall 44c. The cylindrical wall 58c defines therein a passage 60c axially aligned with the torch aperture 38c and with a spark plug 56c having a set of electrodes 57c extending through the other end wall 46c of the insert 40c and disposed in an end space 76c left between the cylindrical wall 58c and the end wall 46c. The cylindrical wall 58c and a cylindrical peripheral wall 42c of the trap chamber 36c defines therebetween an annular side space 68c connected to and continuous with the end space 76c, as in the third embodiment 10b shown in FIGS. 5 and 6.

Figure 8:
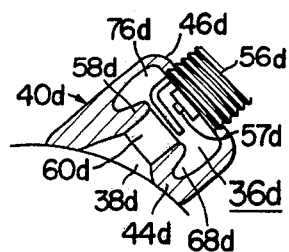

The trap-chamber insert 40d shown in FIG. 8 is similar in structure to the trap-chamber insert 40c shown in FIG. 7 with the exception that the insert 40d and parts thereof have greatly axially reduced dimensions compared with those shown in FIG. 7. Parts shown in FIG. 8 similar to those in FIG. 7 are designated by similar reference numerals added with a character "d."

Figure 9:
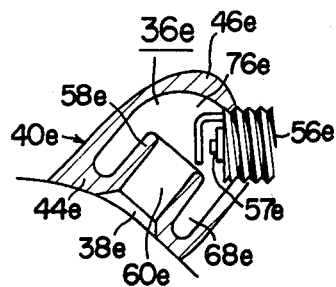

The trap-chamber insert 40e shown in FIG. 9 is generally similar in structure to the insert 40c shown in FIG. 7 with the exceptions that an end wall 46e of the insert 40e remote from a cylindrical wall 58e is generally hemispherical and that a set of electrodes 57e of a spark plug 56e protrudes through the hemispherical end wall 46e into a trap chamber 36e with the axis of the spark plug 56e extending obliquely relative to the axis of a passage 60e defined in the cylindrical wall 58e.

Figure 10:
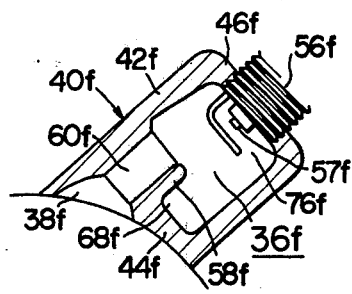

The trap-chamber insert 40f shown in FIG. 10 is generally similar to the insert shown in FIG. 7 with the exception that a cylindrical wall 58f extending from an end wall 44f of the insert 40f and defining therein a passage 60f is connected at a portion of its periphery to a peripheral wall 42f of the insert 40f. The passage 60f is axially aligned with a torch aperture 38f formed in the end wall 44f but is radially offset from the axis of a spark plug 56f having a set of electrodes 57f protruding through the other end wall 46f into an end space 76f left between the end wall 46f and the inner end of the cylindrical wall 58f. The cylindrical wall 58f cooperates with the peripheral wall 42f of the trap chamber 36f to define a generally crescent side space 68f connected to and continuous with the end space 76f.

Figure 11:
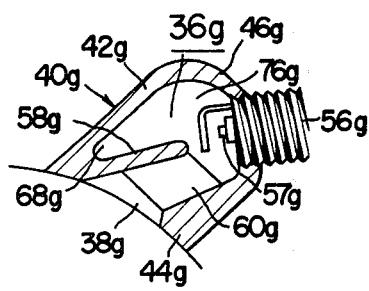

The trap-chamber insert 40g shown in FIG. 11 is generally similar to the insert 40e shown in FIG. 9 with the exception that a cylindrical wall 58g extending from an end wall 44g of the insert 40g is connected at a point of its periphery to a peripheral wall 42g of the insert 40g and defines a passage 60g which is divergent outwardly to an outwardly divergent torch aperture 38g formed in the end wall 44g. The passage 60g has an axis extending obliquely relative to the axis of the trap chamber 36g and generally parallel to the axis of a spark plug 56g having a set of electrodes 57g protruding through a generally hemispherical end wall 46g into an end space 76g in the trap chamber 36g. The cylindrical wall 58g cooperates with the peripheral wall 42g of the trap chamber 36g to define a generally crescent side space 68g connected to and continuous with the end space 76g.

The trap chambers 36c to 36g shown in FIGS. 7 to 11 are operable substantially as in the preceding embodiments 10 to 10b of the invention.

What is claimed is:

1. In an improved torch-ignition internal combustion engine of the type which includes a cylinder block defining therein a cylinder bore, a piston reciprocally mounted in said cylinder bore, a cylinder head mounted on the top of said cylinder block to cooperate with said cylinder bore and said piston to define a main combustion chamber, said cylinder head defining therein an intake port connected to said main combustion chamber, an intake valve for controlling the communication between said main combustion chamber and said intake port, said main combustion chamber being supplied with a fresh charge of a lean air-fuel mixture through said intake port when said intake valve is open on an intake stroke of said engine, a trap chamber confined in said cylinder head and communicated with said main combustion chamber through a torch aperture, a part of the mixture charge to said main combustion chamber being introduced through said torch aperture into said trap chamber and retained therein during a compression stroke of said engine, and a spark plug having a set of electrodes disposed within said trap chamber at a point remote from said torch aperture to ignite the mixture in said trap chamber thereby to produce a torch running through said torch aperture into said main combustion chamber for the torch-ignition of the mixture therein, said trap chamber being so shaped as to have end and peripheral walls, said torch aperture being formed in one of the end walls, said plug electrodes protruding through the other end wall into said trap chamber, wherein the improvement comprises:

wall means in said trap chamber defining a generally tubular passage and cooperating with the inner periphery of said trap chamber to define therebetween a side space remote from said plug electrodes, said tubular passage being substantially axially aligned with said torch aperture, said wall means having an end spaced a distance from the other end wall of said trap chamber to define therebetween an end space connected to and continuous with both said tubular passage and said side space, said plug electrodes being disposed in said end space, the end of said side space adjacent to said one end wall of said trap chamber being communicated with the end of said tubular passage adjacent to said torch aperture, said part of the mixture charge being forced to flow from said torch aperture through said tubular passage towards said plug electrodes during the compression stroke of said engine to displace residual combustion gases away from said plug electrodes into said side space whereby said plug electrodes are exposed to and surrounded by said mixture charge part and the displaced residual combustion gases are retained in said side space until said plug electrodes ignite said mixture charge part.

2. A torch-ignition engine according to claim 1, wherein said passage is substantially coaxial with said spark plug.

3. A torch-ignition engine according to claim 1, wherein the other end of said wall means is also spaced a distance from said one end wall of said trap chamber to define an additional end space therebetween.

4. A torch-ignition engine according to claim 3, wherein said cylindrical wall is supported from the trap chamber peripheral wall by at least one radial wall extending therebetween, and wherein said side space is defined by the cooperation of said radial wall with said cylindrical wall and said trap chamber peripheral wall, said side space being circumferentially discontinuous and having axial ends connected to and continuous with said end spaces, repsectively.

5. A torch-ignition engine according to claim 1, wherein said passage is substantially straight.

6. A torch-ignition engine according to claim 5, wherein said trap chamber has a substantially cylindrical cross-section and wherein said passage defining wall means comprise a substantially cylindrical wall disposed in said trap chamber in substantially concentric relationship to the peripheral wall of said trap chamber.

7. A torch-ignition engine according to claim 5, wherein said trap chamber has a substantially quadrilateral cross-section and wherein said passage defining wall means include a pair of substantially parallel walls extending between a first pair of opposite side walls of the trap chamber to cooperate therewith to define said passage, said parallel walls also cooperating with the other side walls of said trap chamber to define therebetween a pair of side spaces each connected to and continuous with said end spaces, respectively.

8. A torch-ignition engine according to claim 1, wherein said passage defining wall means comprises a substantially cylindrical wall having one end connected to the end wall of said trap chamber in which said torch aperture is formed, said cylindrical wall having an outer peripheral surface inwardly spaced from the peripheral wall of said trap chamber, the other end of said cylindrical wall being spaced a distance from the other end wall of said trap chamber with an end space left therebetween, said plug electrodes being disposed in said end space.

9. A torch-ignition engine according to claim 8, wherein said trap chamber peripheral wall is substantially cylindrical and cooperates with said cylindrical wall to define therebetween a circumferentially continuous side space connected to and continuous with said end space.

10. A torch-ignition engine according to claim 9, wherein a plurality of lateral apertures are formed in and extend through said cylindrical wall adjacent to said torch aperture to communicate said passage with said circumferentially continuous side space.

* * * * *